US008548791B2

(12) United States Patent
Itagaki et al.

(10) Patent No.: US 8,548,791 B2
(45) Date of Patent: Oct. 1, 2013

(54) VALIDATION OF THE CONSISTENCY OF AUTOMATIC TERMINOLOGY TRANSLATION

(75) Inventors: Masaki Itagaki, Redmond, WA (US); Takako Aikawa, Seattle, WA (US); Xiaodong He, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1562 days.

(21) Appl. No.: 11/897,197

(22) Filed: Aug. 29, 2007

(65) Prior Publication Data

US 2009/0063126 A1 Mar. 5, 2009

(51) Int. Cl.
*G06F 17/28* (2006.01)
*G06F 17/20* (2006.01)

(52) U.S. Cl.
USPC .................................................. 704/2; 704/8

(58) Field of Classification Search
USPC ........................................ 704/2, 4, 8
See application file for complete search history.

(56) References Cited

U.S. PATENT DOCUMENTS

| | | | | |
|---|---|---|---|---|
| 5,088,038 A | | 2/1992 | Tanaka et al. ................. 364/419 |
| 5,140,522 A | * | 8/1992 | Ito et al. ............................. 704/2 |
| 5,214,583 A | * | 5/1993 | Miike et al. ....................... 704/4 |
| 5,608,622 A | * | 3/1997 | Church ............................. 704/3 |
| 5,873,055 A | | 2/1999 | Okunishi .......................... 704/2 |
| 5,960,397 A | * | 9/1999 | Rahim .......................... 704/244 |
| 6,473,729 B1 | | 10/2002 | Gastaldo et al. .................. 704/4 |
| 6,594,821 B1 | | 7/2003 | Banning et al. ............... 717/136 |
| 6,885,985 B2 | | 4/2005 | Hull .................................. 704/2 |
| 7,031,911 B2 | | 4/2006 | Zhou et al. ...................... 704/10 |
| 7,072,826 B1 | | 7/2006 | Wakita ............................. 704/2 |
| 7,191,115 B2 | | 3/2007 | Moore ............................. 704/2 |
| 7,209,875 B2 | | 4/2007 | Quirk et al. ...................... 704/2 |
| 7,653,531 B2 | * | 1/2010 | Sneddon et al. ............... 704/10 |
| 2002/0111789 A1 | | 8/2002 | Hull ................................. 704/4 |
| 2004/0030542 A1 | * | 2/2004 | Fuji ................................. 704/2 |
| 2004/0098247 A1 | | 5/2004 | Moore ............................. 704/4 |
| 2005/0102130 A1 | * | 5/2005 | Quirk et al. ...................... 704/4 |
| 2005/0137854 A1 | * | 6/2005 | Cancedda et al. ............... 704/9 |
| 2006/0004560 A1 | * | 1/2006 | Whitelock ....................... 704/2 |
| 2006/0015320 A1 | * | 1/2006 | Och ................................. 704/2 |
| 2006/0111892 A1 | | 5/2006 | Menezes et al. ................. 704/7 |
| 2008/0019281 A1 | * | 1/2008 | Liger et al. ................... 370/252 |

OTHER PUBLICATIONS

Bengio, "Statistic Machine Learning from data: Gaussian Mixture Model", lecture notes of DIAP Research Institute, Martigny, Switzerland, Rerieved from www.archive.org, the document was archived on Jun. 21, 2007.*

(Continued)

*Primary Examiner* — Jialong He
(74) *Attorney, Agent, or Firm* — Westman, Champlin & Kelly, P.A.

(57) ABSTRACT

A method of determining the consistency of training data for a machine translation system is disclosed. The method includes receiving a signal indicative of a source language corpus and a target language corpus. A textual string is extracted from the source language corpus. The textual string is aligned with the target language corpus to identify a translation for the textual string from the target language corpus. A consistency index is calculated based on a relationship between the textual string from the source language corpus and the translation. An indication of the consistency index is stored on a tangible medium.

20 Claims, 6 Drawing Sheets

(56) References Cited

OTHER PUBLICATIONS

Papineni et al. "BLEU: a Method for Automatic Evaluation of Machine Translation", Proceedings of the 40th Annual Meeting of the Association for Computational Linguistics (ACL), Philadelphia, Jul. 2002, pp. 311-318.*

Doddington, "Automatic Evaluation of Machine Translation Quality Using N-gram Co-Occurrence Statistics". In Human Language Technology: Notebook Proceedings:128-132. 2002, San Diego.*

Vogel et al. "The CMU Statistical Machine Translation System", Proceedings of MT Summit, 2003.*

Koehn, "Statistical Significance Tests for Machine Translation Evaluation", Proceedings of EMNLP, 2004.*

Sanja Seljan et al. "Translation memory Database in the Translation Process." In: Proceedings of the 17$^{th}$ International Conference on Information and Intelligent Systems. Sep. 2006.

Dan Tufis. "Term Translations in Parallel Corpora: Discovery and Consistency Check." In: Proceedings of the 4$^{th}$ International Conference on Language Resources and Evaluation (LREC 2004). Lisbon, Portugal, May 2004, pp. 1981-1984.

International Search Report and Written Opinion of PCT/US2008/072553 Filed Aug. 8, 2008.

Koehn, Philipp, et al., *Statistical Phrase-Based Translation*, Proceedings of HLT-NAACL 2003, Main Papers, pp. 48-54, Edmonton, May-Jun. 2003.

Hutchins, John, *The Development and Use of Machine Translation Systems and Computer-Based Translation Tools*, International Symposium on Machine Translation and Computer Language Information Processing, Jun. 26-28, 1999, Beijing, China, pp. 1-19.

Venugopa, Ashish, et al., *Effective Phrase Translation Extraction from Alignment Models*, Proceedings of the 41$^{st}$ Annual Meeting of the Association for Computational Linguistics, Jul. 2003, pp. 319-326.

* cited by examiner

| Product | Source Language | Target Language | Frequency |
|---|---|---|---|
| 1 | Value Type | 値の型 | 15 |
|   | Value Type | 値の種類 | 1 |
|   | Value Type | 値型 | 23 |
| 2 | Value Type | 値の型 | 4 |
| 3 | Value Type | 値の型 | 3 |
|   | Value Type | 値の種類 | 1 |
| 4 | Value Type | 値の型 | 1 |
| 5 | Value Type | 値の型 | 5 |
|   | Value Type | 値型 | 1 |
| 6 | Value Type | 値の型 | 18 |
|   | Value Type | 値型 | 55 |

FIG. 4

| Product | Source Language | Target Language | Frequency | $\left(\frac{f}{k}\right)_j^2$ | $\sum_{j=1}^{m}\left(\frac{f}{k}\right)_j^2$ |
|---|---|---|---|---|---|
| 1 | Value Type | 値の型 | 15 | .1479 | .4964 |
| 1 | Value Type | 値の種類 | 1 | .0007 | .4964 |
| 1 | Value Type | 値型 | 23 | .3478 | .4964 |
| 2 | Value Type | 値の型 | 4 | 1.0000 | 1.0000 |
| 2 | Value Type | | | | |
| 3 | Value Type | 値の型 | 3 | .5625 | .6250 |
| 3 | Value Type | 値の種類 | 1 | .0625 | .6250 |
| 4 | Value Type | 値の型 | 1 | 1.0000 | 1.0000 |
| 5 | Value Type | 値の型 | 5 | .6944 | .7222 |
| 5 | Value Type | 値型 | 1 | .0278 | .7222 |
| 6 | Value Type | 値の型 | 18 | .0608 | .6285 |
| 6 | Value Type | 値型 | 55 | .5677 | .6285 |

VALIDATION OF THE CONSISTENCY OF AUTOMATIC TERMINOLOGY TRANSLATION

BACKGROUND

The present discussion is generally related to automatic translation of text from one language to another. More particularly, the present discussion is related to translation training data used during the translation of text.

Consistency is one of the primary quality measurements of any translation of text from one language to another, whether translations are performed manually or automatically. This is especially true in certain applications such as technical discussions, where inconsistent translations of terminology can cause confusion. Indeed, consistency in the translation of terminology is important to the readability of localized materials and any example-based/statistical machine translation quality. The quality of such machine translation systems, which utilize parallel data corpuses in both a source language (the language in which the text to be translated is written) and a target language (the language in which the text is to be translated) to find examples of translations and select translations using statistical methods thus depend on the quality of training data from which translations are created. Inconsistencies in terminology translations could lead to lower quality translations.

However, terminology can be translated differently, depending on a given context. As an example, the English term "file name" can have multiple Japanese variations, including "ファイルの名前", "ファイル名", and "文書名〃". While multiple translations for some terms is inevitable, given the different contexts in which particular terms can be used, if inconsistent terms are used in the same context, than readers of translated texts can become confused.

Terminology translation inconsistency may derive from different sources. One potential cause of inconsistency can be a lack of standardized terminology data. If particular terminology is not standard in either the source language or the target language, multiple translations of the terminology will probably yield inconsistent results. Another potential cause of inconsistency can be human errors. Regardless of the cause, inconsistencies in acquired training data presents problems unless the inconsistencies are recognized and addressed to ensure consistent translation of terminology by machine translators.

The discussion above is merely provided for general background information and is not intended to be used as an aid in determining the scope of the claimed subject matter.

SUMMARY

In one illustrative embodiment, a method of determining the consistency of training data for a machine translation system is discussed. The method includes receiving a signal indicative of a source language corpus and a target language corpus and extracting a textual string from the source language corpus. The method further includes aligning the source language corpus with the target language corpus to identify a translation for the textual string from the target language corpus. A consistency index based on a relationship between the textual string from the source language corpus and the translation is calculated and an indication of the consistency index is stored on a tangible medium.

In another illustrative embodiment, a system configured to determine the consistency of training data including a source language corpus and a target language corpus for a machine translation system is discussed. The system includes an extractor, an aligner, and a classifier. The extractor is capable of receiving a signal indicative of a source language corpus, storing the source language corpus on a tangible medium and manipulating the signal to extract a first textual string from the source language corpus. The aligner is capable of aligning the source language corpus with the target language corpus to identify a second textual string that serves as a translation for the first textual string. The classifier is capable of classifying the validity of the translation based on a relationship between the first textual string and the second textual string.

In yet another illustrative embodiment, a method of training an automatic translation system is discussed. The method includes aligning a source language corpus with a target language corpus to identify a translation for the textual string from the target language corpus. The method further includes calculating a consistency index based on a relationship between the textual string from the source language corpus and the translation and storing an indication of the consistency index on a tangible medium.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
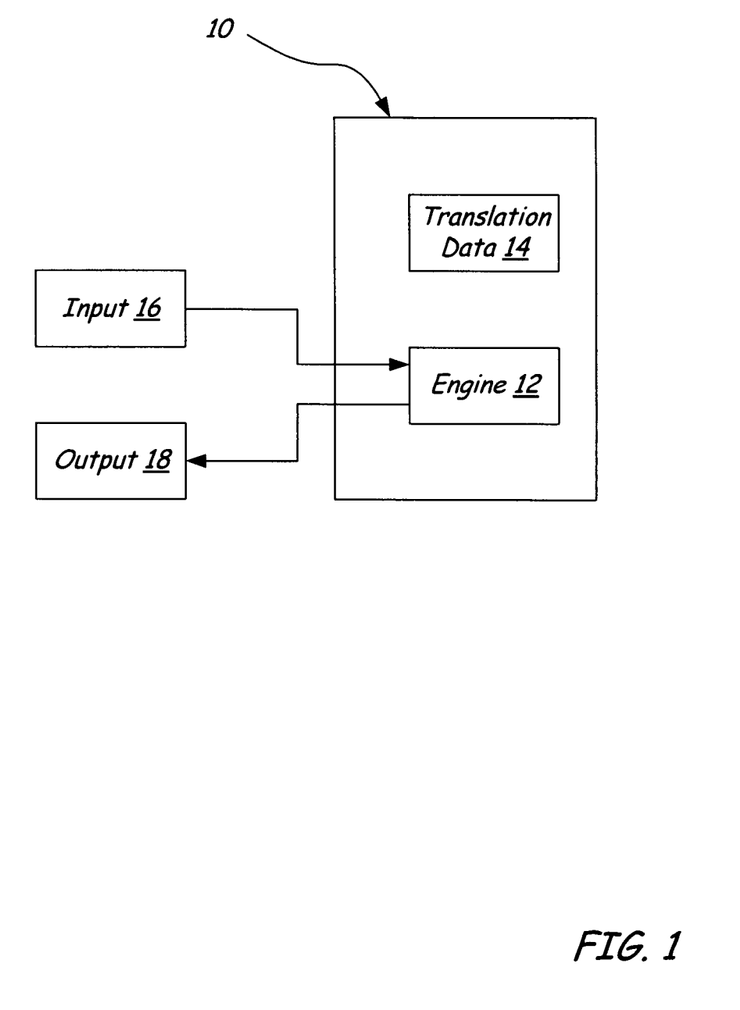
FIG. 1 is a rudimentary block diagram of an automated translation system.

FIG. 1 is a block diagram of an automated translation system 10 for translating a textual input from one language to another. Automated translation system 10 includes an engine 12 that is in communication with training data 14. Training data 14, in one illustrative embodiment, includes aligned parallel data corpuses in a source language and a target language, although the training data 14 can take on many forms. For example, the training data 14 can include extracted mappings that are subsequently aligned at run time. The target language data corpus is a translation of the source language data corpus and is aligned with the source language data corpus. The subject matter of language in the source and target language data corpuses can vary depending upon the applications for which the translation system 10 is intended to be used. For the purposes of the current discussion, the subject matter of the source and target data corpuses is related to terminology used in software user interface applications, although other applications may use any subject matter.

The engine 12 receives an input 16 of textual input in the source language. The engine 12 then accesses the training data 14, which the engine 12 uses to create a translation in the target language for the input 16. The translation is then provided as an output 18 of the translation system 10.

Figure 2:
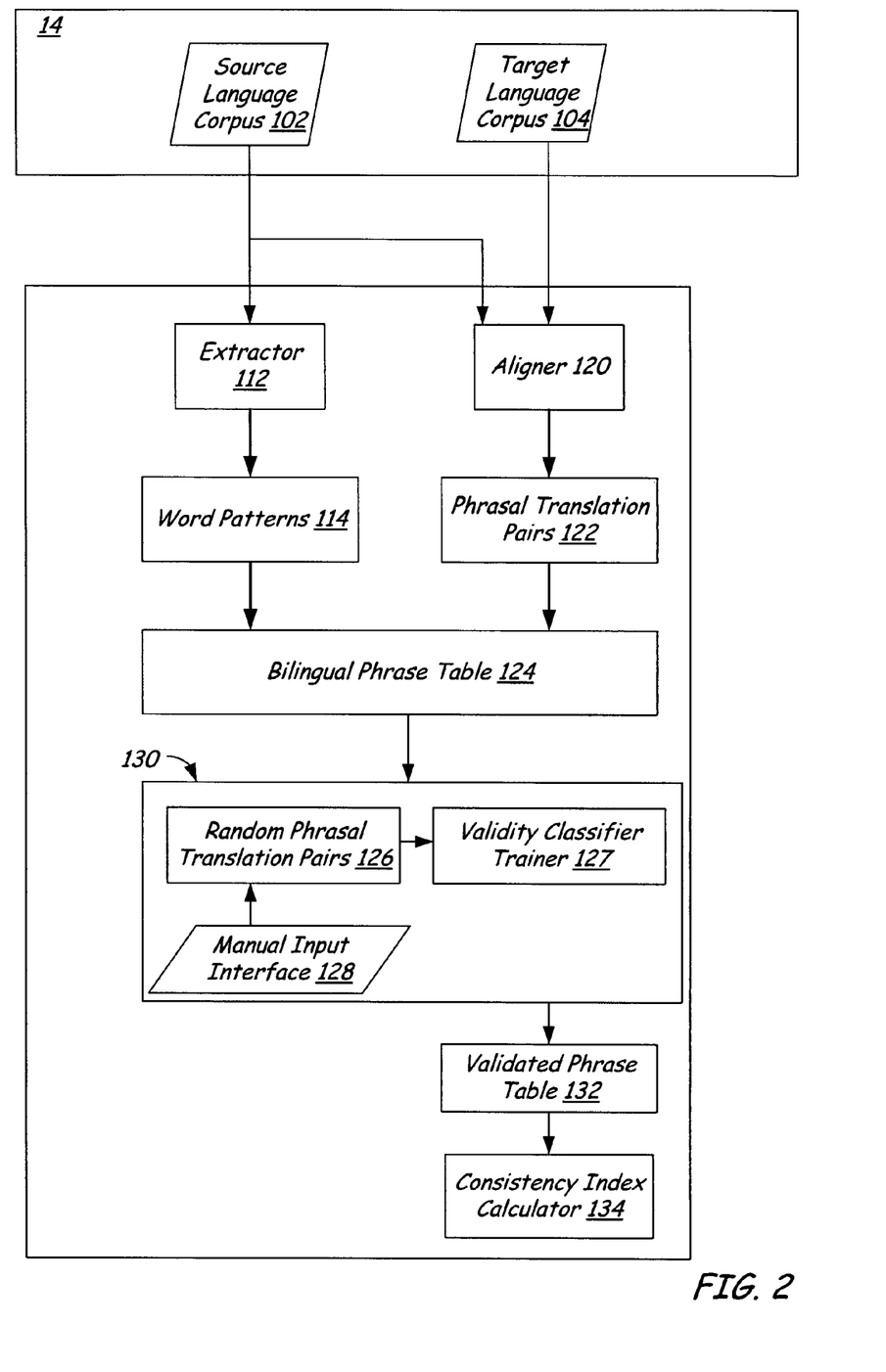
FIG. 2 is a block diagram illustrating a system for evaluating the consistency of training data for the automated translation system of FIG. 1 according to one illustrative embodiment.

FIG. 2 illustrates a system 100 for evaluating the consistency of training data 14 of the type used in the automated translation system 10 illustrated in FIG. 1 according to one illustrative embodiment. The training data 14 illustratively includes a source language corpus 102 and a target language corpus 104.

The source language corpus 102 illustratively includes representations of a plurality of text strings in a source language and the target language corpus 104 includes representations of the plurality of text strings in the source language corpus 102 translated into a target language. The text strings collected into the source language corpus 102 can come from any of a variety of sources. For the purposes of the examples provided in this discussion, the source language is presumed to be English and the target language is presumed to be Japanese, although the system 100 can be implemented with any combination of source and target languages. Furthermore, as discussed above, for the purposes of this discussion the source language corpus 104 includes data related to software user interfaces, such as menu items, error messages, and the like. It should be appreciated that the source language corpus 102 can receive textual information from a variety of different software products.

System 100 includes an extractor 112, which is capable of receiving text strings from the source language corpus 102. When the extractor 112 receives text strings from the source language corpus 102, it illustratively extracts one or more word patterns 114 from the source language corpus 102. In the illustrative example, the extractor 112 extracts compound nouns from the source language corpus 102 so that the word patterns 114 includes a plurality of compound noun phrases. The extractor 112, in one example, extracts word patterns having between two and five nouns consecutively. Alternatively, extractor 112 can be set to extract any particular word pattern from the source language corpus 102 and is not limited to extracting compound noun phrases. Examples of word patterns 114 that are illustratively extracted from the source language corpus 102 include server administrator, network connection, value type, and web server. Of course, any number of word patterns 114 can be extracted from the source language corpus 102, depending upon the size of the corpus.

System 100 also illustratively includes a word aligner 120, which is configured to receive both the source language corpus 102 and the target language corpus 104 and align words in the source language with words in the target language. The word aligner 120 illustratively provides a bi-directional alignment, that is, the source language corpus 102 is aligned with the target language corpus 104 and the target language corpus 106 is aligned with the source language corpus 104. Thus, two different word alignments are made.

The word aligner 120 illustratively provides phrasal translation pairs 122 to a bilingual phrase table 124. The phrasal translation pairs 122 are bi-directionally consistent—that is, phrasal translation pairs 122 are words that are aligned only to each other in each direction. Each entry in the bilingual phrase table 124 illustratively includes a phrasal translation pair 122 as well as information related to the phrasal translation table. In one illustrative example, where the source language is derived from translations related to particular software products, a particular phrasal translation pair 122 will indicate from which product the source language came and, of course, its aligned translation. Furthermore, the bilingual phrase table 124 receives the word patterns 114 extracted from the source language corpus 104. For a variety of different reasons discussed above, a word phrase in the source language corpus 102 can be a part of more than one phrasal translation pair 122. That is, a single word phrase in the source language corpus 102 can be aligned with a number of different word phrases in the target language corpus 104. The data in the bilingual phrase table 124 is illustratively organized to match each word pattern 114 with every translation pair 122 provided by the aligner that matches the particular word pattern 114.

System 100 further includes a validity classifier 130, which is illustratively configured to classify the validity of the phrasal translation pairs in the bilingual phrase table 124. The validity classifier 130 receives, as an input, phrasal translation pairs from the bilingual phrase table 124. To build the validity classifier, a small portion of randomly selected phrasal translation pairs 126 are annotated and then used as training data to train the classifier. In addition, the validity classifier 130 also illustratively receives information related to the phrasal translation pairs 122 from the bilingual phrase table 124, which will be discussed in more detail below. The validity classifier 130 provides, as an output, a validated phrase table 132, which can be used to evaluate the validity of the bilingual phrase table 124.

Returning to the validity classifier 130. Before any use, the validity classifier 130 is illustratively trained. A small portion of randomly selected phrasal translation pairs 126 are accessible by a human via an manual input interface 128, which is configured to allow for review and annotation of the phrasal translation pairs 126. By reviewing the pairs, judgments about the validity of a particular translation pair can be made. For example, a human fluent in both the source and target language may recognize that a phrasal translation pair within the randomly selected phrasal translation pairs 126 does not represent a valid translation and annotate it as such. The human annotated data are illustrated as validity classifier trainer 127. The validity classifier trainer 127 is configured to be used as training data to train the automatic validity classifier 130. Once trained, the validity classifier 130 is then configured to classify unseen translation pairs as valid or invalid. The training is illustratively performed based on statistical machine learning algorithms such as, for example, a maximum likelihood training of a particular Gaussian Mixture Model. After training, the validity classifier 130 thus configured to take all phrasal translation pairs 126 from bilingual phrase table 124 as input and provide a validated phrase table 132 as an output. The validated phrase table 132 is illustratively compared against all of the phrasal translation pairs 122 in the bilingual phrase table 124 to determine the validity of each phrasal translation pair.

System 100 further includes a consistency index calculator 134. The consistency index calculator 134 receives, as an input, information related to the valid phrasal translation pairs 122 determined by the validity calculator 130 and provides a consistency index to the bilingual table 124 indicative of the consistency of the translation of a particular source phrase. Details of the calculation of the consistency index will be discussed in more detail below.

Figure 3:
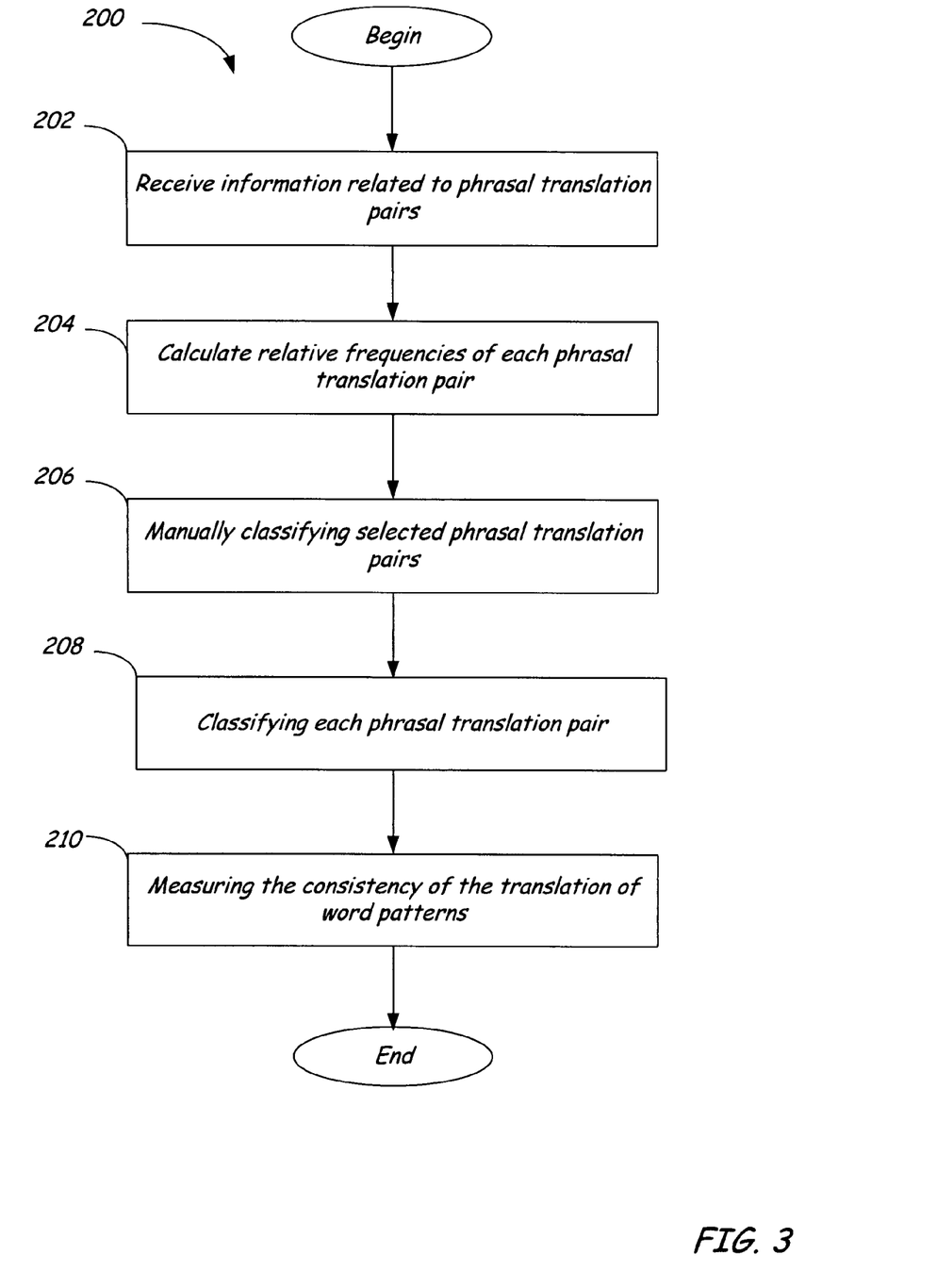
FIG. 3 is a flow diagram illustrating a method of determining the consistency of a phrasal translation pair according to one illustrative embodiment.

FIG. 3 illustrates a method 200 of verifying the consistency of the translation of a word pattern according to one illustrative embodiment. The method includes calculating the indication 132 of the validity of a phrasal translation pair 122 by the validity classifier 130 illustrated in FIG. 2. The validity calculator receives information related to phrasal translation pairs 122 from the extractor 112 and the word aligner 120 illustrated in FIG. 1. This is represented by block 202. The information provided to the validity classifier 130 illustratively includes a word pattern extracted from the source language corpus 104 and one or more aligned word phrases from the target language corpus 106. In addition, the information provided to the validity classifier 130 illustratively includes information related to the number of occurrences that each of the phrasal translation pairs 122 occur.

Once the information is provided to the validity classifier 130, method 200 provides the calculation of the relative frequencies of each phrasal translation pair 122. This is represented by block 204. The consistency calculator 134 estimates the probability that a given phrase, s, from the source language will be translated to a given phrase, t, in the target language by calculating the relative frequency that the phrasal translation pair s-t occurs in the aligned parallel data corpuses. This is represented by:

$$p(t|s) = \frac{count(t, s)}{\sum_{t'} count(t', s)}.$$

The probability calculated by the above equation is illustratively known as a maximum likelihood estimation score (MLE1). In addition, the probability of s given t is calculated as follows:

$$p'(s|t) = \frac{count(s, t)}{\sum_{s'} count(s', t)}.$$

The probability here is also known as a maximum likelihood estimation score (MLE2).

Method 200 also illustratively includes preparing a set of training data that can be used to train a validity classifier. Preparing a set of training data illustratively includes selecting a number of phrasal translation pairs 122 and manually annotating each pair to determine whether each of the selected phrasal translation pairs 122 are a valid or an invalid translation pair. This is represented by block 206. As expected, most invalid translations have low MLE1 and MLE2 scores.

Method 200 also includes classifying each of the phrasal translation pairs 122. This is represented by block 208. In one illustrative embodiment, classifying the phrasal translation pairs 122 includes employing a Gaussian mixture model (GMM) to build the classifier. A first GMM, $\lambda_v$, represents a valid translation class, that is, the class of phrase pairs where the target phrases are deemed to be a valid translation of the corresponding source phrase. A second GMM, $\lambda_i$, represents an invalid translation class. The GMM is illustratively represented as:

$$p(x|\lambda) = \sum_{k=1}^{K} c_k N(x|\mu_k, \Sigma_k)$$

where K is the number of Gaussian components in the GMM, $c_k$ is a positive mixture weight of the k-th Gaussian component, and $\Sigma_{k=1}^{K} c_k=1$. $N(x|\mu_k, \Sigma_k)$ is a Gaussian distribution such that $$N(x|\mu_k, \Sigma_k) = \frac{1}{(2\pi)^{\frac{D}{2}}|\Sigma|^{\frac{1}{2}}} \cdot e^{\frac{1}{2}(x-\mu_k)^T \Sigma^{-1}(x-\mu_k)}$$

where $\mu_k$ and $\Sigma_k$ are the mean vector and covariance matrix of the k-th Gaussian component, D is the dimension of feature vector x. In our approach, the feature vector includes two features, MLE1, and MLE2, i.e., x=[MLE1, MLE2]$^T$. Therefore, D=2, $\mu_k$ is a two dimensional vector, and $\Sigma_k$ is two by two matrix. To further reduce the number of free parameters, a diagonal covariance matrix is illustratively used so that only the diagonal elements of $\Sigma_k$ have non-zero values.

Given the training samples of valid and invalid translations discussed above, the parameters $\lambda_v$ and $\lambda_i$, including mixtures weights, mean vectors and covariance matrices of Gaussian mixtures can be trained using maximum likelihood criterion. Specifically, the GMM of the valid translation class, $\lambda_v$, is illustratively trained by:

$$\lambda_v = \underset{\lambda}{\operatorname{argmax}} \prod_{n=1}^{N} p(x_n|\lambda)$$

where $x_n$, n=1, ..., N are N feature vectors of training samples marked as valid translations. The invalid translation class, $\lambda_i$, can be similarly trained.

Once the translation classes are trained, a translation pair 122 is classified as a class, C(y), where C is one of the valid and invalid classes. The classification is illustratively calculated as follows:

$$C(y) = \underset{C=\{valid,invalid\}}{\operatorname{argmax}} p(\lambda_C|y) = \underset{C=\{valid,invalid\}}{\operatorname{argmax}} p(y|\lambda_C)p(\lambda_C).$$

The $p(y|\lambda_C)$ term is illustratively computed according to equation (1) above. The $p(\lambda_C)$ term is illustratively the prior probability of class C, where C is either the valid or invalid class. The prior probability of class C is, in one embodiment, estimated from the relative frequency of the class in the classifier training data. For instance, the prior probability of the valid class, $p(\lambda_v)$, is calculated as:

$$p(\lambda_C) = \frac{count(valid\ translation\ pairs)}{count(total\ translation\ pairs)}$$

and $p(\lambda_i) = 1 - p(\lambda_v)$.

Figure 4:
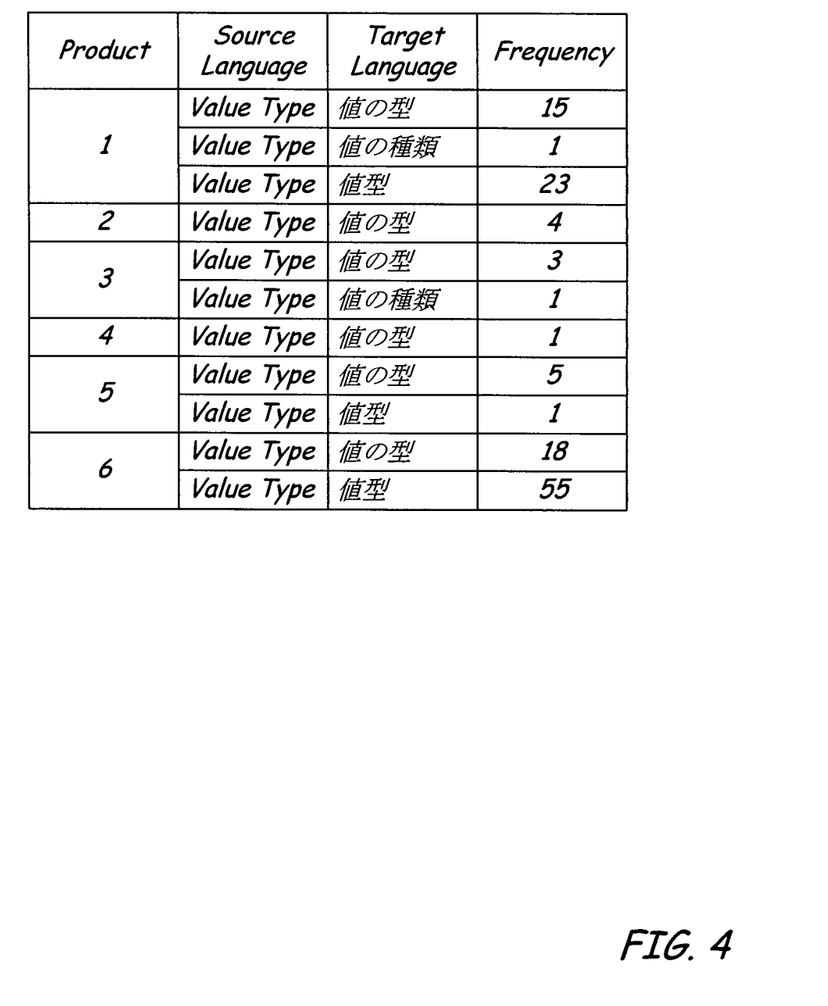
FIG. 4 is a table illustrating phrasal translation pairs including word patterns from the table of FIG. 2 aligned with phrases from the target language corpus of FIG. 1.

Method 200 further includes measuring the consistency of the translation of word patterns 114 (illustrated in FIG. 1). This is represented by block 210. Measuring the consistency of the translation includes receiving phrasal translation pairs that have been deemed valid, as is shown in block 302. FIG. 4 is a table illustrating the word pattern "value type" taken from an English language corpus and machine-identified translations of the word pattern in Japanese. The word pattern "value type" illustratively has five translations in the target language corpus 104, three of which have been have been classified as valid. From there, the consistency of the valid translations is measured. This is illustratively accomplished by analyzing the bilingual corpus to identify the occurrences of the valid translations, sorted by product. The results of the sorting are illustrated in FIG. 4.

Once the occurrences of the various translations have been sorted, a translation consistency index is calculated. The translation consistency index is described as $$C_t = \frac{\sum_{i=1}^{n} \sum_{j=1}^{m} \left(\frac{f}{k}\right)_j^2}{n}.$$

where n is the number of products in which the word pattern appears, m is the number of different valid translations of the word pattern, f is the frequency of the jth valid translation in the ith product and k is the total number of valid translations in the ith product.

Figure 5:
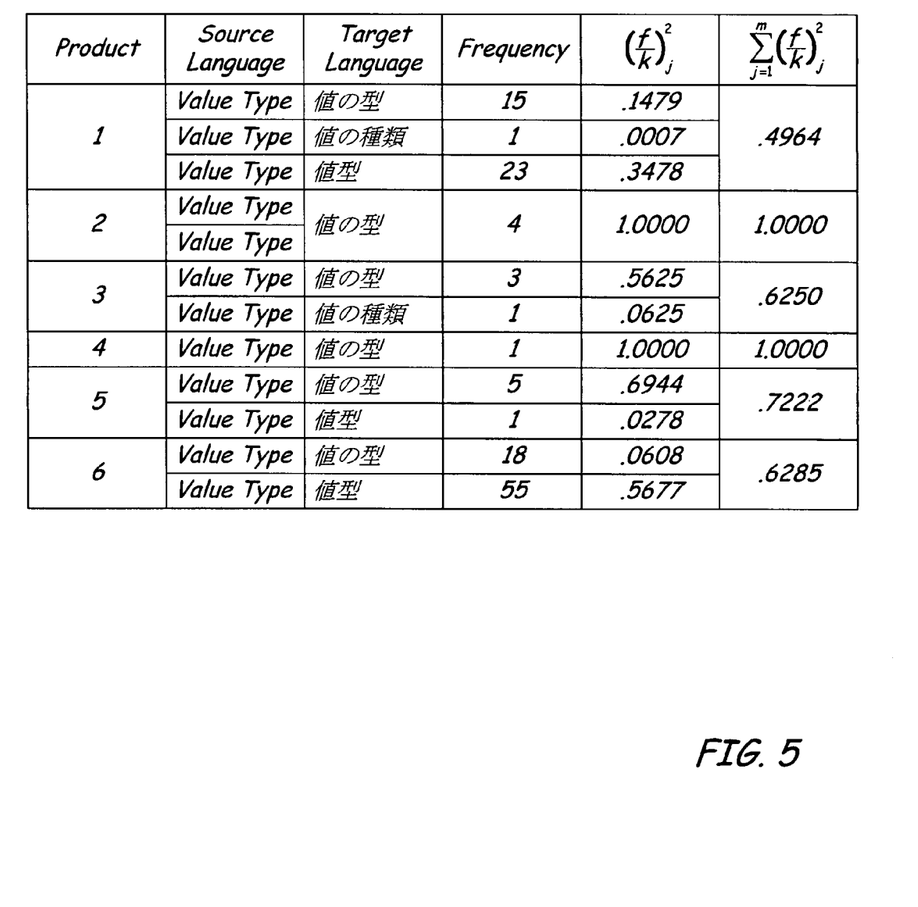
FIG. 5 is a table illustrating consistency indices calculated for the phrasal translation pairs of FIG. 4.

FIG. 5 illustrates the consistency of the translation of word pattern "value type" as broken down by product. Each individual product has a consistency value and the overall consistency index is illustratively calculated as an average of the consistency per product. As an example, the consistency index of the translation of the word pattern "value type" is 0.745. The consistency index of a given word pattern provides information related to the overall consistency and reliability of the translation.

The embodiments discussed above provide several advantages. The validity of each translation is analyzed and invalid translations are eliminated from consideration by a machine translator, thereby reducing the likelihood of an invalid translation. Furthermore, the calculation of a consistency index provides an indication of the stability of a translation. When a consistency index for a word pattern is very high, for example 1.000, it is an indication that a translator should not create any new translations unless it is necessary. With lower consistency indices, such as the 0.745 illustrated above, a particular translation should probably not be selected without considering the context of the translation.

One of the most difficult tasks in translation quality assurance is to find defects in the translations, such as inconsistent and wrong terminology translations. Since bilingual text data usually has a number of source and target segments and sentences, identifying multiplicity in translations in a large text data set requires systematic approaches. The translation consistency index provides a good tool for automation of the quality assurance of training translation data.

Figure 6:
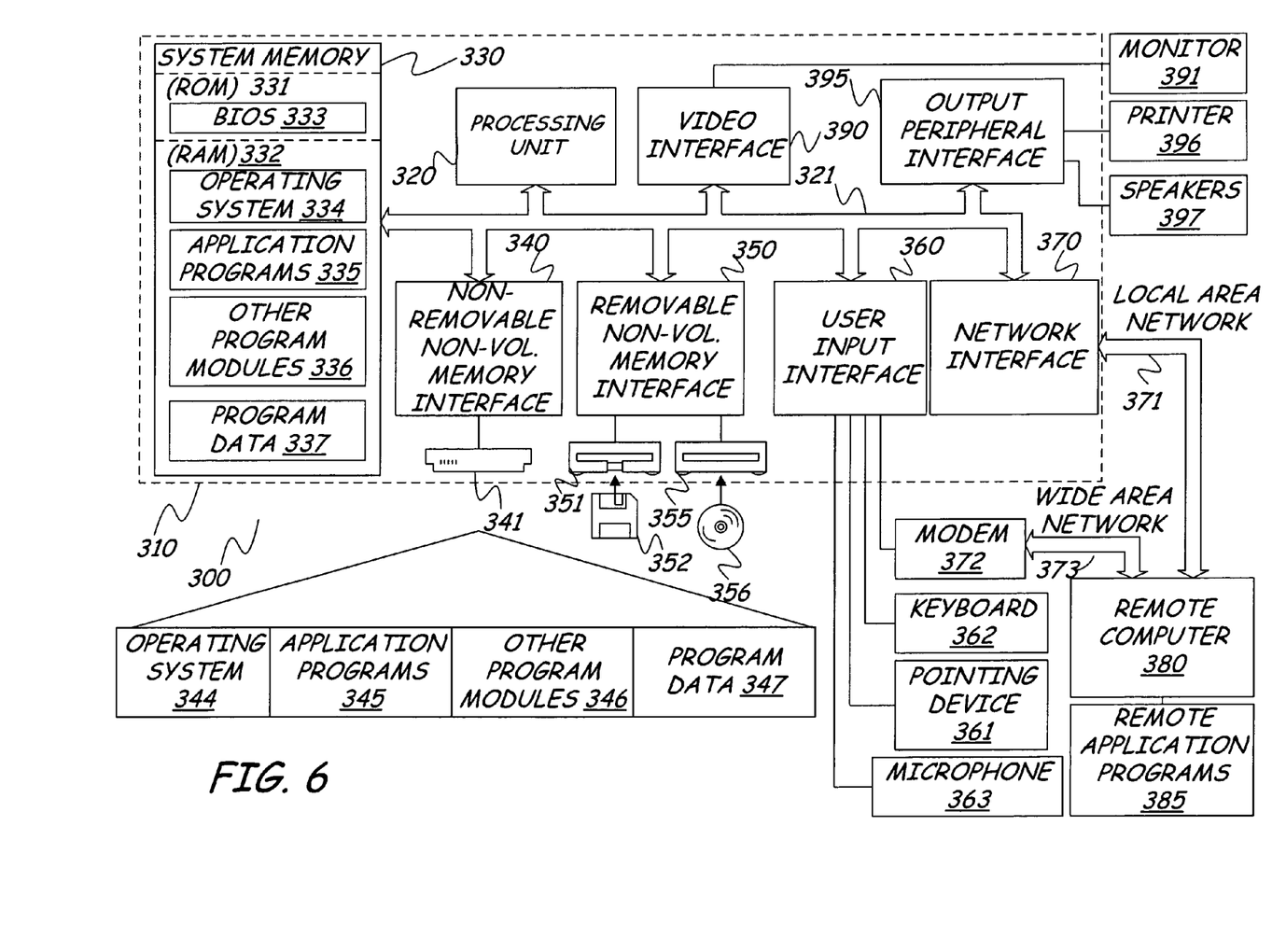
FIG. 6 is a block diagram of one computing environment in which some embodiments may be practiced.

FIG. 6 illustrates an example of a suitable computing system environment 300 on which embodiments may be implemented. The computing system environment 300 is only one example of a suitable computing environment and is not intended to suggest any limitation as to the scope of use or functionality of the claimed subject matter. Neither should the computing environment 300 be interpreted as having any dependency or requirement relating to any one or combination of components illustrated in the exemplary operating environment 300.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 6, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 6 illustrates operating system 334, application programs 335, other program modules 336, and program data 337.

The computer 310 may also include other removable/non-removable volatile/nonvolatile computer storage media. By way of example only, FIG. 6 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 6, provide storage of computer readable instructions, data structures, program modules and other data for the computer 310. In FIG. 6, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 6 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 6 illustrates remote application programs 385 as residing on remote computer 380. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of determining consistency of training data for a machine translation system, comprising:
   receiving a signal indicative of a source language corpus and a target language corpus;
   extracting a textual string from the source language corpus;
   aligning the source language corpus with the target language corpus to identify a plurality of translations for the textual string from the target language corpus;
   utilizing a processor that is a component of a computing device to calculate a consistency index for each of the plurality of translations, the consistency index for each of the plurality of translations being based at least in part on a number of products in which the translation appears, a frequency of the translation in each of the products, and a total number of valid translations of the textual string in the products;
   calculating an overall consistency index for the plurality of translations; and
   storing indications of the consistency indexes and the overall consistency index onto a tangible medium.

2. The method of claim 1, wherein calculating the overall consistency index comprises calculating an overall consistency index for each of the products as an average of the consistency indexes associated with the product.

3. The method of claim 1 and further comprising:
   classifying each of the plurality of translations as one of a valid translation and an invalid translation.

4. The method of claim 3, wherein classifying each of the plurality of translations includes applying a Gaussian mixture model to build a classifying model.

5. The method of claim 4, wherein applying a Gaussian mixture model includes applying a Gaussian mixture model based on a maximum likelihood estimation score.

6. The method of claim 5 and further comprising:
   calculating the maximum likelihood estimation score from previously classified phrasal translation pairs.

7. The method of claim 6, wherein calculating maximum likelihood estimation score includes calculating the score based on valid translations.

8. The method of claim 6, wherein calculating maximum likelihood estimation score includes calculating the score based on invalid translations.

9. The method of claim 1, and further comprising:
   sorting the consistency indexes by each of the products; and
   storing an indication of the product associated with each of the consistency indexes onto the tangible medium.

10. The method of claim 1, wherein the products include a number of different software products.

11. The method of claim 1, wherein calculating the consistency index is based on a number of occurrences of alignment between the source language corpus and each of the valid translations in the target language corpus.

12. A system configured to determine consistency of training data including a source language corpus and a target language corpus for a machine translation system, comprising:
   an extractor that receives a signal indicative of the source language corpus and that manipulates the signal to extract a first textual string from the source language corpus;
   an aligner that aligns the source language corpus with the target language corpus to identify a second textual string that serves as a translation for the first textual string; and
   a processor that is a component of a computing device, the processor determining a maximum likelihood estimation score for the translation given the first textual string and classifying the translation as belonging to either a valid translation class or an invalid translation class based upon the maximum likelihood estimation score, the valid translation class being trained utilizing feature vectors of training samples marked as valid translations, and the invalid translation class being trained utilizing feature vectors of training samples marked as invalid translations
   a calculator that calculates a consistency index based at least in part on a number of products in which the translation appears a frequency of the translation in each of the products, and a total number of valid translations of the textual string in the products.

13. The system of claim 12 and further comprising:
   the calculator further calculates an overall consistency index.

14. The system of claim 12, wherein the valid translation class is represented utilizing a first Gaussian mixture model and the invalid translation class is represented utilizing a second Gaussian mixture model.

15. A method of training an automatic translation system, comprising:
   aligning a source language corpus with a target language corpus to identify a plurality of translations for a textual string from the target language corpus;
   determining a frequency of each of the plurality of translations in a plurality of products;
   utilizing a processor that is a component of a computing device to calculate, for each of the plurality of products, a consistency index for each of the plurality of translations based on the frequency of the translation in the plurality of products;
   generating a phrasal translation pair table that includes a plurality of rows, each row having information that identifies one of the plurality of products, one of the plurality of translations, the frequency of the one of the plurality of translations in the one of the plurality of products, and the consistency index of the one of the plurality of translations in the one of the plurality of products; and
   storing an indication of the phrasal translation pair table on a tangible medium.

16. The method of claim 15, and further comprising:
   calculating an overall consistency index for each of the plurality of products and
   wherein each row of the phrasal translation pair table includes information that identifies the overall consistency index for the product associated with the row.

17. The method of claim 15, wherein calculating the consistency index for each of the plurality of translations includes calculating the consistency index based on a relationship between the textual string and fewer than all of the plurality of translations.

18. The method of claim 15, and further comprising:
   classifying each of the plurality of translations as one of a valid translation and an invalid translation; and
   wherein calculating the consistency index for each of the plurality of translations includes calculating the consistency index based on a relationship between the textual string and each of the plurality of translations classified as a valid translation.

19. The method of claim 15, wherein calculating the consistency index for each of the plurality of translations includes calculating a plurality of ratios each based on an occurrence of at least one of the plurality of translations in the target language corpus.

20. The method of claim 19, wherein calculating the consistency index for each of the plurality of translations includes calculating a relationship between the plurality of ratios.

* * * * *